(12) United States Patent
Wang

(10) Patent No.: US 11,908,651 B2
(45) Date of Patent: Feb. 20, 2024

(54) INTELLIGENT CIRCUIT BREAKER CAPABLE OF AUTOMATICALLY RELEASING AND TRIPPING IN POWER FAILURE

(71) Applicant: TIANJIN JMT ELECTRIC EQUIPMENT CO., LTD, Tianjin (CN)

(72) Inventor: Kecheng Wang, Tianjin (CN)

(73) Assignee: TIANJIN JMT ELECTRIC EQUIPMENT CO., LTD, Tianjin (CN)

( * ) Notice: Subject to any disclaimer, the term of this patent is extended or adjusted under 35 U.S.C. 154(b) by 413 days.

(21) Appl. No.: 17/428,583

(22) PCT Filed: Mar. 18, 2020

(86) PCT No.: PCT/CN2020/080082
§ 371 (c)(1),
(2) Date: Aug. 4, 2021

(87) PCT Pub. No.: WO2020/211590
PCT Pub. Date: Oct. 22, 2020

(65) Prior Publication Data
US 2022/0028643 A1     Jan. 27, 2022

(30) Foreign Application Priority Data

Apr. 16, 2019  (CN) .......................... 201910304445.1
Dec. 9, 2019   (CN) .......................... 201911250741.4

(51) Int. Cl.
*H01H 71/32* (2006.01)
*H02J 9/06* (2006.01)

(52) U.S. Cl.
CPC ............. *H01H 71/321* (2013.01); *H02J 9/06* (2013.01)

(58) Field of Classification Search
CPC .... H01H 71/321; H01H 71/325; H01H 83/12; H01H 71/32; H02J 9/06
See application file for complete search history.

(56) References Cited

U.S. PATENT DOCUMENTS 4,251,789 A    2/1981  Russell et al.
5,105,326 A    4/1992  Shimp et al.

FOREIGN PATENT DOCUMENTS

CA        2053238 A1 *  8/1991
CN      201616403 U  * 10/2010
(Continued)

OTHER PUBLICATIONS

International Search Report of PCT/CN2020/080082.
Written Opinion of PCT/CN2020/080082.

*Primary Examiner* — Mohamad A Musleh

(57) ABSTRACT

The present invention discloses an intelligent circuit breaker capable of automatically releasing and tripping in power failure, with an electromagnetic force capable of controllably changing a current direction arranged between a permanent magnetic field force and a mechanical spring force, and three forces are designed on a straight line, the permanent magnet static iron core, the electromagnetic moving iron core and the electromagnetic coil are respectively fixed on the electromagnetic coil framework through a first shaft hole, a second shaft hole and a wire slot, a tripping energy storage spring is sleeved on the tripping transmission rod, a permanent magnet attraction reset shifting fork is arranged in a shifting groove of the tripping transmission rod, and one end of the tripping transmission rod is provided with a tripping connecting rod.

10 Claims, 2 Drawing Sheets

(56) References Cited

FOREIGN PATENT DOCUMENTS

| | | | | |
|---|---|---|---|---|
| CN | 103187215 A | * | 7/2013 | ............. H01H 71/12 |
| CN | 104505315 A | | 4/2015 | |
| CN | 104821262 A | * | 8/2015 | |
| CN | 107123577 A | * | 9/2017 | ............. H01H 71/32 |
| CN | 107622926 A | | 1/2018 | |
| CN | 109887812 A | | 6/2019 | |
| CN | 110137044 A | | 8/2019 | |
| EP | 0542274 A1 | * | 5/1993 | |
| KR | 20050122067 A | * | 12/2005 | |
| WO | 0243095 A1 | | 5/2002 | |

* cited by examiner

INTELLIGENT CIRCUIT BREAKER CAPABLE OF AUTOMATICALLY RELEASING AND TRIPPING IN POWER FAILURE

CROSS-REFERENCE TO RELATED APPLICATIONS

This application is a national stage application of PCT/CN2020/080082. This application claims priorities from PCT Application No. PCT/CN2020/080082, filed Mar. 18, 2020, from the Chinese patent application 201910304445.1 filed Apr. 16, 2019, and from the Chinese patent application 201911250741.4, filed Dec. 9, 2019, the content of which are incorporated herein in the entirety by reference.

TECHNICAL FIELD

The present invention relates to the field of circuit breakers, in particular to an intelligent circuit breaker capable of automatically releasing and tripping in power failure.

BACKGROUND OF THE PRESENT INVENTION

A sudden power failure of the power grid is often accompanied by a sudden powering on. On the one hand, the impact on electric equipment can be caused, and on the other hand, potential safety hazards are brought to personnel nearby the equipment. At present, in ordinary circuit breakers or current intelligent circuit breakers on the market, in the case of a sudden power failure at the input port, there is no energy to trigger the tripping mechanism of the circuit breaker to trip. Regarding some intelligent circuit breakers capable of automatically releasing and tripping in power failure, during automatic tripping, if the residual power is limited, enough force cannot be provided to directly impact the tripping mechanism of the circuit breaker to trip. If a very sensitive intermediate mechanical tripping device is triggered by a small electromagnetic force, and the intermediate mechanical tripping device is triggered and impacts the circuit breaker to trip, the miniature circuit breaker will be bulky and the structure is too complicated. The biggest drawback is that the small mechanical vibration will cause false tripping. In most cases, a contactor for the intelligent circuit breaker can be replaced or omitted. If it cannot resist vibration like a contactor and have the function of automatically disconnecting the contact after a power failure, the so-called replacement will not be realized. Therefore, the present disclosure proposes an intelligent circuit breaker capable of automatically releasing and tripping in a power failure to solve the shortcomings in the prior art.

SUMMARY OF THE PRESENT INVENTION

In order to overcome the shortcomings of the prior art, the present invention adds an electromagnetic field force capable of changing a current direction between a tripping force of a mechanical spring and an attraction force of a permanent magnetic field for preventing tripping, a current in an electromagnetic coil can be immediately reversed through a program embedded in a control circuit, a repulsive force with the same direction as a tripping force of a tripping energy storage spring is formed through a magnetic field of the reversed current and the permanent magnetic field, the direction of a magnetic field force generated by the electromagnetic coil is rapidly switched, from blocking tripping to assisting tripping rapidly, and a mechanical energy storage mode which is complex in structure, too sensitive and not tolerant to mechanical vibration is changed into an electromagnetic energy storage mode so that the contradiction between tripping sensitivity and tolerance to vibration of the traditional circuit breaker is thoroughly solved.

The present invention provides an intelligent circuit breaker capable of automatically releasing and tripping in power failure, with an electromagnetic force capable of controllably changing a current direction arranged between a permanent magnetic field force and a mechanical spring force, and the electromagnetic force, the permanent magnetic field force and the mechanical spring force are designed on a straight line, comprising a circuit breaker housing, a permanent magnet static iron core, an electromagnetic moving iron core and an electromagnetic coil, wherein an electromagnetic coil framework and a support are arranged in the circuit breaker housing, the permanent magnet static iron core, the electromagnetic moving iron core and the electromagnetic coil are respectively fixed on the electromagnetic coil framework through a first shaft hole, a second shaft hole and a wire slot, a tripping transmission rod is arranged on the electromagnetic moving iron core, the electromagnetic moving iron core and the tripping transmission rod are of an integrated structure, a tripping energy storage spring is sleeved on the tripping transmission rod; the electromagnetic moving iron core, the tripping energy storage spring 7 and the tripping transmission rod 8 form an electromagnetic moving iron core tripping mechanism assembly and are attracted by the permanent magnet static iron core; a permanent magnet attraction reset shifting fork is arranged in a shifting groove of the tripping transmission rod, and one end of the tripping transmission rod is provided with a tripping connecting rod, the tripping transmission rod is in close contact with the tripping connecting rod; a second energy storage module, a control circuit and a first energy storage module are sequentially arranged inside the circuit breaker housing, and a moving contact movement mechanism is arranged on an upper portion of the tripping transmission rod.

A further improvement is that: an impact force of the tripping energy storage spring and an electromagnetic field force of the electromagnetic moving iron core form a resultant force, the resultant force is transmitted to the tripping connecting rod by the tripping transmission rod to cause the circuit breaker to trip, and the tripping electromagnetic force of the tripping transmission rod is provided by energy storage of the second energy storage module during normal work and energy storage released at a moment of power failure.

A further improvement is that: the second energy storage module is connected with the control circuit, and electric energy release of the second energy storage module is controlled by the control circuit.

A further improvement is that: an area near point P on the permanent magnet attraction reset shifting fork is in contact with a corresponding point on the moving contact movement mechanism, so that the permanent magnet attraction reset shifting fork pushes the electromagnetic moving iron core tripping mechanism assembly to be attracted by the permanent magnet static iron core again, and preparation is made for the next tripping.

A further improvement is that: an electric energy current released by the second energy storage module is a reverse current, a magnetic field force generated by the reverse current repels the permanent magnetic field force, and the magnetic field force generated by the reverse current has the same direction as a tripping force of the tripping energy storage spring.

A further improvement is that: a working electric energy of the control circuit after power failure is derived from the energy storage of the first energy storage module during normal working, a program of the control circuit is used for ensuring that current flows through the electromagnetic coil in a forward direction during normal working of the circuit breaker, and an electromagnetic field force generated by the forward current and permanent magnetic field force interact to generate attraction force.

A further improvement is that: the first energy storage module and the second energy storage module are any elements capable of storing electric energy.

A further improvement is that: an aperture of the first shaft hole is larger than that of the second shaft hole.

A further improvement is that: the electromagnetic coil, the electromagnetic coil framework and the permanent magnet static iron core form an electromagnetic coil assembly, the electromagnetic coil assembly is mounted in an electromagnetic coil acupuncture point of the circuit breaker housing, and the electromagnetic moving iron core tripping mechanism assembly is placed in a shaft hole of the electromagnetic coil assembly.

A further improvement is that: an attraction force of the permanent magnet static iron core to the electromagnetic moving iron core tripping mechanism assembly is greater than an elastic force of the tripping energy storage spring when the circuit breaker normally works.

The beneficial effect of the present invention includes: by adding an electromagnetic field force capable of changing the current direction between the mechanical spring tripping force and the permanent magnetic field attraction force that prevents tripping, the current direction is controlled by the control circuit. By implanting a program inside the control circuit, the current in the electromagnetic coil can be kept in the forward direction when the circuit breaker is working normally. The magnetic field generated by the forward current can increase the attraction force of the permanent magnetic field and improve the shock resistance of the circuit breaker. When there is an energy failure or the protection is tripped, the program implanted in the control circuit will immediately turn the current in the electromagnetic coil into a reverse direction. The magnetic field of the reverse current and the permanent magnetic field form a repulsive force consistent with the tripping force of the tripping energy storage spring in direction. The direction of a magnetic field force generated by the electromagnetic coil is rapidly switched, from blocking tripping to assisting tripping rapidly, and a mechanical energy storage mode which is complex in structure, too sensitive and not tolerant to mechanical vibration is changed into an electromagnetic energy storage mode so that the contradiction between tripping sensitivity and tolerance to vibration of the traditional circuit breaker is thoroughly solved.

In which:
1: permanent magnet static iron core;
2: electromagnetic moving iron core;
3: electromagnetic coil;
4: electromagnetic coil framework;
5: support;
6: permanent magnet attraction reset shifting fork;
7: tripping energy storage spring;
8; tripping transmission rod;
9: tripping connecting rod;
10: control circuit;
11: first energy storage module;
12: second energy storage module;
13: moving contact movement mechanism;
14: first shaft hole;
15: second shaft hole;
16: wire slot.

DETAILED DESCRIPTION OF THE PRESENT INVENTION

The following will clearly and completely describe the technical solutions in the embodiments of the present invention with reference to the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

Figure 1:
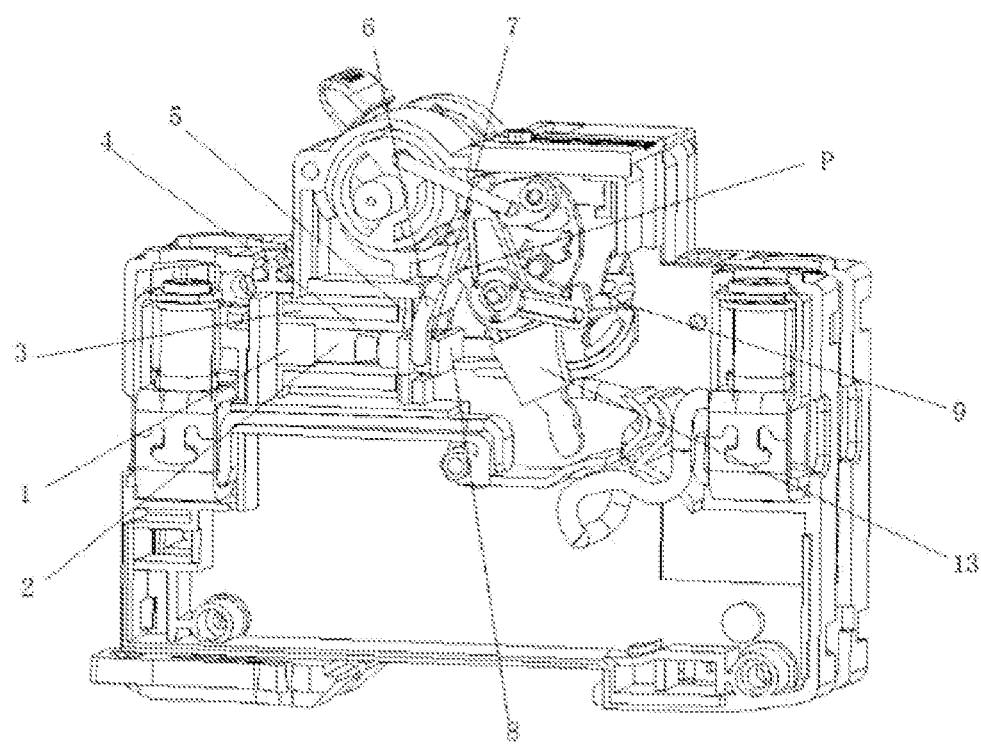
FIG. 1 is a three-dimensional schematic diagram of the structure of the present invention.
Figure 2:
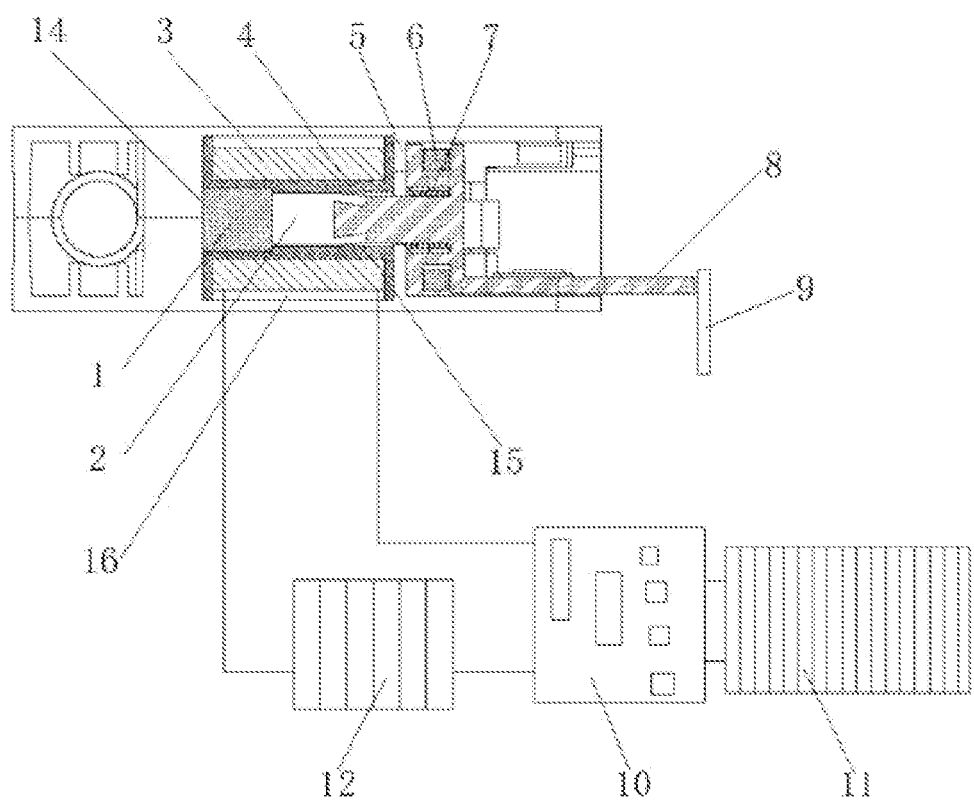
FIG. 2 is a schematic diagram of the working principle of the structure of the present invention.

As shown in FIGS. 1, 2, the embodiment provides an intelligent circuit breaker capable of automatically releasing and tripping in power failure, with an electromagnetic force capable of controllably changing a current direction arranged between a permanent magnetic field force and a mechanical spring force, and the electromagnetic force, the permanent magnetic field force and the mechanical spring force are designed on a straight line, comprising a circuit breaker housing, a permanent magnet static iron core 1, an electromagnetic moving iron core 2 and an electromagnetic coil 3, wherein an electromagnetic coil framework 4 and a support 5 are arranged in the circuit breaker housing, the permanent magnet static iron core 1, the electromagnetic moving iron core 2 and the electromagnetic coil 3 are respectively fixed on the electromagnetic coil framework 4 through a first shaft hole 14, a second shaft hole 15 and a wire slot 16, a tripping transmission rod 8 is arranged on the electromagnetic moving iron core 2, the electromagnetic moving iron core 2 and the tripping transmission rod 8 are of an integrated structure, a tripping energy storage spring 7 is sleeved on the tripping transmission rod 8, the electromagnetic moving iron core 2, the tripping energy storage spring 7 and the tripping transmission rod 8 form an electromagnetic moving iron core tripping mechanism assembly and are attracted by the permanent magnet static iron core 1, a permanent magnet attraction reset shifting fork 6 is arranged in a shifting groove of the tripping transmission rod 8, and one end of the tripping transmission rod 8 is provided with a tripping connecting rod 9, the tripping transmission rod 8 is in close contact with the tripping connecting rod 9, a second energy storage module 12, a control circuit 10 and a first energy storage module 11 are sequentially arranged inside the circuit breaker housing, and a moving contact movement mechanism 13 is arranged on an upper portion of the tripping transmission rod 8.

An impact force of the tripping energy storage spring 7 and an electromagnetic field force of the electromagnetic moving iron core 2 form a resultant force, the resultant force is transmitted to the tripping connecting rod 9 by the tripping transmission rod 8 to cause the circuit breaker to trip, and the tripping electromagnetic force of the tripping transmission rod 8 is provided by energy storage of the second energy storage module 12 during normal work and energy storage released at a moment of power failure. The second energy storage module 12 is connected with the control circuit 10, and electric energy release of the second energy storage module 12 is controlled by the control circuit 10. An area near point P on the permanent magnet attraction reset shifting fork 6 is in contact with a corresponding point P on the moving contact movement mechanism 13, so that the permanent magnet attraction reset shifting fork 6 pushes the electromagnetic moving iron core tripping mechanism assembly to be attracted by the permanent magnet static iron core 1 again, and preparation is made for the next tripping. An electric energy current released by the second energy storage module 12 is a reverse current, a magnetic field force generated by the reverse current repels the permanent magnetic field force, and the magnetic field force generated by the reverse current has the same direction as a tripping force of the tripping energy storage spring 7. A working electric energy of the control circuit 10 after power failure is derived from the energy storage of the first energy storage module 11 during normal working, a program of the control circuit 10 is used for ensuring that current flows through the electromagnetic coil 3 in a forward direction during normal working of the circuit breaker, and an electromagnetic field force generated by the forward current and permanent magnetic field force interact to generate attraction force. The first energy storage module 11 and the second energy storage module 12 are any elements capable of storing electric energy. An aperture of the first shaft hole 14 is larger than that of the second shaft hole 15. The electromagnetic coil 3, the electromagnetic coil framework 4 and the permanent magnet static iron core 1 form an electromagnetic coil assembly, the electromagnetic coil assembly is mounted in an electromagnetic coil acupuncture point of the circuit breaker housing, and the electromagnetic moving iron core tripping mechanism assembly is placed in a shaft hole of the electromagnetic coil assembly. An attraction force of the permanent magnet static iron core 1 to the electromagnetic moving iron core tripping mechanism assembly is greater than an elastic force of the tripping energy storage spring 7 when the circuit breaker normally works.

In normal operation, the permanent magnet static iron core 1 attracts the electromagnetic moving iron core 2, and the tripping energy storage spring 7 is compressed when the electromagnetic moving iron core 2 and the permanent magnet static iron core 1 are attracted each other. The electromagnetic moving iron core tripping mechanism assembly triggers required kinetic energy under the action of a permanent magnetic field force, the kinetic energy is stored in a manner of an elastic potential energy, and the permanent magnetic field force is larger than the elastic force, so that it can be ensured that, when the electromagnetic coil 3 is not electrified, the electromagnetic moving iron core tripping assembly and the permanent magnet static iron core 1 are kept attracted with each other. When abnormal and power failure faults occur, some electric energy can be remained in the filter capacitor in the electronic circuit of the intelligent circuit breaker, the first energy storage module 11 can keep the electronic control circuit 10 to complete some other actions, and the control circuit 10 is connected with the second energy storage module 12 and the electric energy in the energy storage module 12 is converted into electromagnetic energy in the electromagnetic coil 3. The direction of the generated magnetic field and the direction of the magnetic field of the permanent magnet static iron core 1 form a repulsive force, the repulsive force and the tripping force of the tripping energy storage spring 7 generate large tripping impact kinetic energy instantly in one direction, and then the tripping transmission rod 8 impacts the tripping connecting rod 9 for tripping, so that the moving contact moving mechanism 13 of the circuit breaker rapidly makes a separation action of anti-clockwise rotation. The action of the movable contact moving mechanism 13 impacts the permanent magnet attraction reset shifting fork 6 at the point P with greater mechanical force, the permanent magnet attraction reset shifting fork 6 automatically presses the tripping transmission rod 8 and the electromagnetic moving iron core 2 back to the attraction position, the tripping energy storage spring 7 is compressed at the same time, and preparation is provided for the next operation and tripping of the circuit breaker.

By adding an electromagnetic field force capable of changing the current direction between the mechanical spring tripping force and the permanent magnetic field attraction force that prevents tripping, the current direction is controlled by the control circuit 10. By implanting a program inside the control circuit 10, the current in the electromagnetic coil 3 can be kept in the forward direction when the circuit breaker is working normally. The magnetic field generated by the forward current can increase the attraction force of the permanent magnetic field and improve the shock resistance of the circuit breaker. When there is an energy failure or the protection is tripped, the program implanted in the control circuit will immediately turn the current in the electromagnetic coil 3 into a reverse direction. The magnetic field of the reverse current and the permanent magnetic field form a repulsive force consistent with the tripping force of the tripping energy storage spring 7 in direction. The direction of a magnetic field force generated by the electromagnetic coil 3 is rapidly switched, from blocking tripping to assisting tripping rapidly, and a mechanical energy storage mode which is complex in structure, too sensitive and not tolerant to mechanical vibration is changed into an electromagnetic energy storage mode so that the contradiction between tripping sensitivity and tolerance to vibration of the traditional circuit breaker is thoroughly solved.

The foregoing shows and describes the basic principles, main features and advantages of the present disclosure. It should be understood by those skilled in the art that the present disclosure is not limited by the above-described embodiments, nor is it limited by the application examples of the described embodiments, which may be applied to other protective intelligent electromagnetic tripping devices, and that the above-described embodiments and description are merely illustrative of the principles of the present disclosure, and that various variations and modifications may be made therein without departing from the spirit and scope of the disclosure. Such variations and modifications are intended to fall within the scope of the disclosure as claimed. The scope of the disclosure is defined by the appended claims and their equivalents.

What is claimed is:

1. An intelligent circuit breaker capable of automatically releasing and tripping in power failure, with an electromagnetic force capable of controllably changing a current direction arranged between a permanent magnetic field force and a mechanical spring force, and the electromagnetic force, the permanent magnetic field force and the mechanical spring force are designed on a straight line, comprising a circuit breaker housing, a permanent magnet static iron core (1), an electromagnetic moving iron core (2) and an electromagnetic coil (3), wherein an electromagnetic coil framework (4) and a support (5) are arranged in the circuit breaker housing, the permanent magnet static iron core (1), the electromagnetic moving iron core (2) and the electromagnetic coil (3) are respectively fixed on the electromagnetic coil framework (4) through a first shaft hole (14), a second shaft hole (15) and a wire slot (16), a tripping transmission rod (8) is arranged on the electromagnetic moving iron core (2), the electromagnetic moving iron core (2) and the tripping transmission rod (8) are of an integrated structure, a tripping energy storage spring (7) is sleeved on the tripping transmission rod (8), the electromagnetic moving iron core (2), the tripping energy storage spring (7) and the tripping transmission rod (8) form an electromagnetic moving iron core tripping mechanism assembly and are attracted by the permanent magnet static iron core (1), a permanent magnet attraction reset shifting fork (6) is arranged in a shifting groove of the tripping transmission rod (8), and one end of the tripping transmission rod (8) is provided with a tripping connecting rod (9), the tripping transmission rod (8) is in close contact with the tripping connecting rod (9), a second energy storage module (12), a control circuit (10) and a first energy storage module (11) are sequentially arranged inside the circuit breaker housing, and a moving contact movement mechanism (13) is arranged on an upper portion of the tripping transmission rod (8).

2. The intelligent circuit breaker capable of automatically releasing and tripping in power failure according to claim 1, wherein an impact force of the tripping energy storage spring (7) and an electromagnetic field force of the electromagnetic moving iron core (2) form a resultant force, the resultant force is transmitted to the tripping connecting rod (9) by the tripping transmission rod (8) to cause the circuit breaker to trip, and the tripping electromagnetic force of the tripping transmission rod (8) is provided by energy storage of the second energy storage module (12) during normal work and energy storage released at a moment of power failure.

3. The intelligent circuit breaker capable of automatically releasing and tripping in power failure according to claim 1, wherein the second energy storage module (12) is connected with the control circuit (10), and electric energy release of the second energy storage module (12) is controlled by the control circuit (10).

4. The intelligent circuit breaker capable of automatically releasing and tripping in power failure according to claim 1, wherein an area near point P on the permanent magnet attraction reset shifting fork (6) is in contact with a corresponding point P on the moving contact movement mechanism (13), so that the permanent magnet attraction reset shifting fork (6) pushes the electromagnetic moving iron core tripping mechanism assembly to be attracted by the permanent magnet static iron core (1) again, and preparation is made for the next tripping.

5. The intelligent circuit breaker capable of automatically releasing and tripping in power failure according to claim 1, wherein an electric energy current released by the second energy storage module (12) is a reverse current, a magnetic field force generated by the reverse current repels the permanent magnetic field force, and the magnetic field force generated by the reverse current has the same direction as a tripping force of the tripping energy storage spring (7).

6. The intelligent circuit breaker capable of automatically releasing and tripping in power failure according to claim 1, wherein a working electric energy of the control circuit (10) after power failure is derived from the energy storage of the first energy storage module (11) during normal working, a program of the control circuit (10) is used for ensuring that current flows through the electromagnetic coil (3) in a forward direction during normal working of the circuit breaker, and an electromagnetic field force generated by the forward current and permanent magnetic field force interact to generate attraction force.

7. The intelligent circuit breaker capable of automatically releasing and tripping in power failure according to claim 1, wherein the first energy storage module (11) and the second energy storage module (12) are any elements capable of storing electric energy.

8. The intelligent circuit breaker capable of automatically releasing and tripping in power failure according to claim 1, wherein an aperture of the first shaft hole (14) is larger than that of the second shaft hole (15).

9. The intelligent circuit breaker capable of automatically releasing and tripping in power failure according to claim 1, wherein the electromagnetic coil (3), the electromagnetic coil framework (4) and the permanent magnet static iron core (1) form an electromagnetic coil assembly, the electromagnetic coil assembly is mounted in an electromagnetic coil acupuncture point of the circuit breaker housing, and the electromagnetic moving iron core tripping mechanism assembly is placed in a shaft hole of the electromagnetic coil assembly.

10. The intelligent circuit breaker capable of automatically releasing and tripping in power failure according to claim 1, wherein an attraction force of the permanent magnet static iron core (1) to the electromagnetic moving iron core tripping mechanism assembly is greater than an elastic force of the tripping energy storage spring (7) when the circuit breaker normally works.

* * * * *